United States Patent [19]
Faklis et al.

[11] Patent Number: 6,006,991
[45] Date of Patent: Dec. 28, 1999

[54] METHOD AND APPARATUS FOR READING BOTH OF STANDARD AND FLUORESCENT BAR CODES

[75] Inventors: Dean Faklis, Fairport; James F. Munro, Ontario; Brian L. Boswell, Rochester, all of N.Y.

[73] Assignee: PSC Inc., Webster, N.Y.

[21] Appl. No.: 08/962,279

[22] Filed: Oct. 31, 1997

[51] Int. Cl.$^6$ ........................................ C06K 7/10
[52] U.S. Cl. ............................. 235/462.06; 235/491
[58] Field of Search ................... 235/462.06, 462.01, 235/462.35, 462, 462.3, 462.16, 491; 427/7; 528/289; 524/608, 88; 209/577; 250/271; 106/21

[56] References Cited

U.S. PATENT DOCUMENTS

| | | | |
|---|---|---|---|
| 4,916,297 | 4/1990 | Tukada et al. | 235/462 |
| 4,983,817 | 1/1991 | Dolash et al. | 235/462 |
| 5,093,147 | 3/1992 | Andrus et al. | 427/7 |
| 5,206,490 | 4/1993 | Petigrew et al. | 235/462 |
| 5,292,855 | 3/1994 | Krutak et al. | 528/289 |
| 5,331,140 | 7/1994 | Stephany | 235/462 |
| 5,336,714 | 8/1994 | Krutak et al. | 524/608 |
| 5,380,992 | 1/1995 | Damen et al. | 235/462 |
| 5,397,819 | 3/1995 | Krutak et al. | 524/88 |
| 5,420,410 | 5/1995 | Bremer | 235/462 |
| 5,423,432 | 6/1995 | Krutak et al. | 209/577 |
| 5,461,136 | 10/1995 | Krutak et al. | 528/289 |
| 5,502,304 | 3/1996 | Berson et al. | 250/271 |
| 5,525,798 | 6/1996 | Berson et al. | 250/271 |
| 5,542,971 | 8/1996 | Auslander et al. | 106/21 |

*Primary Examiner*—Thien M. Le
*Assistant Examiner*—Daniel S. Felten
*Attorney, Agent, or Firm*—Foley & Lardner

[57] ABSTRACT

A bar code label scanning system comprises a light source for producing a light beam at a first wavelength which is swept across a bar code. Light from the bar code is passed through a filter for attenuating light scattered from said bar code to approximately a level of light emitted from a fluorescent ink, having an excitation wavelength equal to said first wavelength, in response to irradiation by said light beam. The filtered light is received and a signal representative of the amplitude of the filtered light is generated. The signal is decoded to provide a bit string encoded in said bar code.

9 Claims, 2 Drawing Sheets

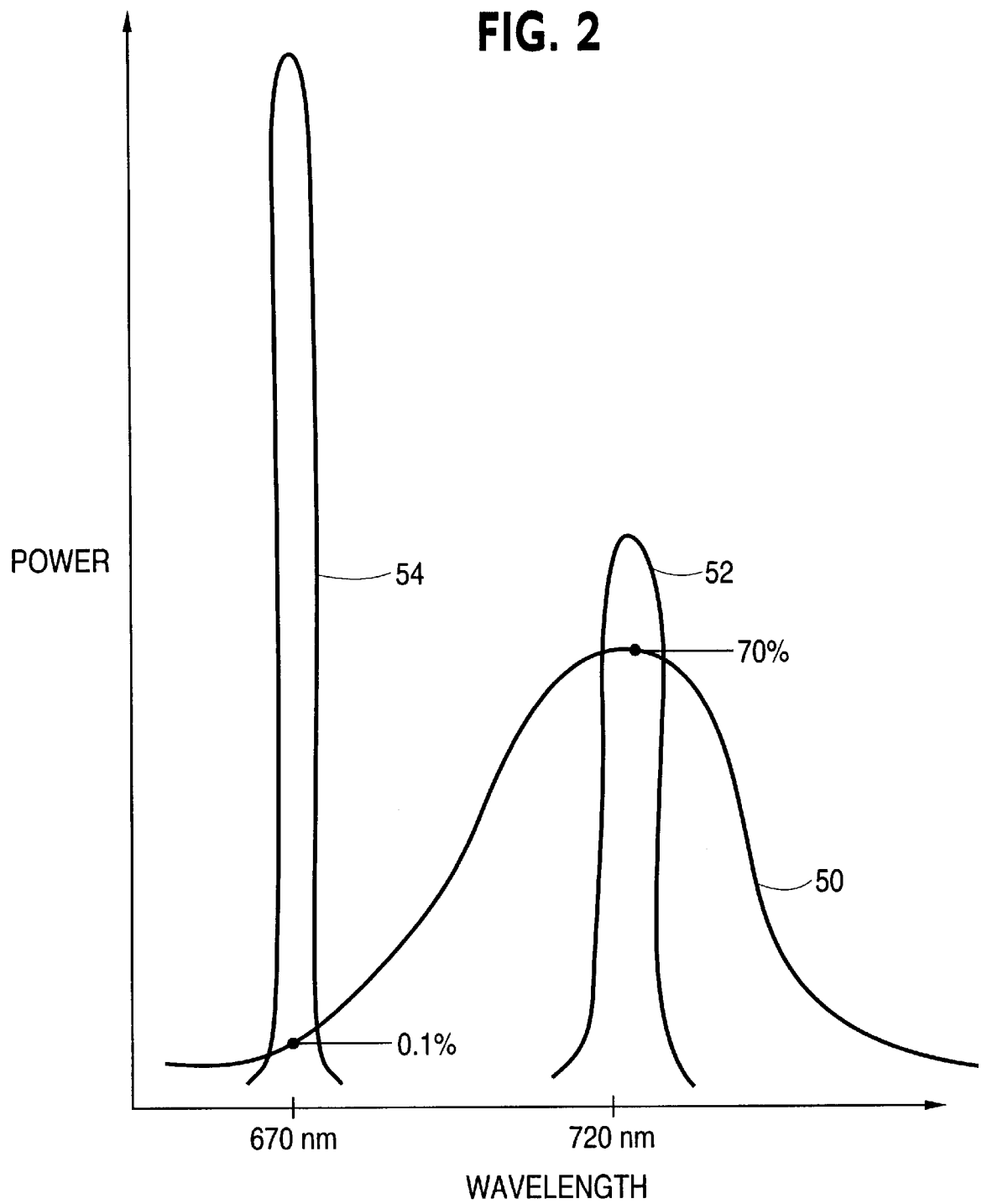

METHOD AND APPARATUS FOR READING BOTH OF STANDARD AND FLUORESCENT BAR CODES

FIELD OF THE INVENTION

The invention pertains to bar code scanner.

BACKGROUND OF THE INVENTION

A bar code is a computer-readable code which represents information. One type of well-known bar code employs a series of parallel bars for encoding a bit string. Other types of bar codes include bar codes formatted as two dimensional matrices.

Bar codes may be read by bar code scanners. One well-known type of bar code scanner generally includes a laser light source, a photodetector, an amplifier, a filter and processing circuitry. In general terms, this type of bar code scanner operates by sweeping a laser beam across a bar code. The beam is swept, for example, by a rotating mirror such as that disclosed in U.S. Pat. No. 5,331,140 (Stephany), which is incorporated herein by reference for its teaching of means for sweeping a beam. Alternatively, one of the other known equivalent means for sweeping a beam may be employed. The light which is received by the photodetector during sweeping of the beam is analyzed to determine the bit string encoded in the bar code.

One well-known type of bar code, which will be referred to herein as a "standard" bar code, is comprised of dark and light bars of different widths. When a laser beam is swept across this type of bar code, the beam is mostly absorbed by the dark parts of the bar code and mostly scattered by the light parts of the bar code. Consequently, during the sweep, the photodetector receives some of the light from the laser beam which is scattered when the beam is directed toward the light parts of the bar code, and receives a relatively negligible amount of light from the laser beam when the beam is directed toward the dark parts of the bar code. The pattern of light received by the photodetector accordingly corresponds to the pattern of bars of the bar code.

The photodetector produces an analog signal which represents the light received during the sweep of the laser beam. This signal is provided to an amplifier which amplifies the signal. The amplified signal is provided to a filter, typically an analog band pass filter that is tuned to reduce primarily those components of the amplified electric signal which do not correspond to the scattered beam. The filtered signal then is provided to the processing circuitry (which can include a combination of analog and digital circuitry), which processes the signal to determine the bit string represented by the bar code.

A second, less common, type of bar code is printed using fluorescent ink. When the fluorescent ink is irradiated by light having a wavelength which is the excitation wavelength of the ink, the ink emits light within a known band of wavelengths which does not include the first wavelength. The fluorescent ink is generally only minimally visible to the human eye under normal lighting conditions. Depending upon the type of ink employed, the light emitted by the fluorescent ink may also be minimally visible or invisible to the human eye.

When fluorescent ink is used to print a bar code, the bar code is read by sweeping the bar code with a laser having a wavelength which is the excitation wavelength of the fluorescent ink. When the beam is swept across the bar code, the bar code emits light from the bars which are printed with the fluorescent ink, and does not emit light from the bars which are represented as blanks (not printed). The light received by the photodetector accordingly includes light scattered by the substrate and light emitted by the fluorescent ink, and therefore varies in amplitude with the pattern of light emitted by the fluorescent bar code.

Fluorescent bar codes have certain advantages over standard bar codes. For example, standard bar codes generally require a plain background which does not interfere with the bar code, and therefore generally must either be segregated from other printed matter or obstruct it. In contrast, a fluorescent bar code can placed anywhere on an object without altering the appearance of the object itself. This is useful for consumer products such as magazines where the visual appearance of the packaging is important. Fluorescent bar codes may also be placed on an object without obstructing other critical information on the object, such as the written address on a piece of mail.

One notable difference between standard and fluorescent bar codes is that they use opposite printing standards for representing "high" and "low" bits of the bar code. In a standard bar code, a light bar represents a high bit, while a dark bar (or printed bar, since standard bar codes are generally printed on relatively light surfaces) represents a low bit. Conversely, in a fluorescent bar code, a high bit is represented by a fluorescent (printed) bar, while a low bit is represented by an unprinted (and therefore non-fluorescent) bar.

There is presently one manner known in the art for reading both fluorescent and standard bar codes using a single reader. U.S. Pat. No. 5,502,304 (Berson et al.) discloses a bar code reader that is capable of reading a standard bar code and a bar code printed in fluorescent ink. The Berson system employs a standard laser beam for reading a standard bar code and an ultraviolet light source for exciting a fluorescent bar code to fluorescence as it is being scanned. The system further employs two separate receivers for receiving laser light scattered by the standard bar code and for receiving light emitted from the fluorescent bar code.

SUMMARY OF THE INVENTION

A primary object of the invention is to provide a bar code reader that is capable of reading both of standard and fluorescent bar codes.

In general terms, the invention employs a laser beam which is tuned to the excitation wavelength of a fluorescent ink. The beam may be used to sweep either a standard bar code or a fluorescent bar code. Light returned from the sweep is passed through an optical filter. The filter is tuned to pass substantially all of light having a wavelength within the emission band of the fluorescent ink. The filter is further tuned to attenuate light having the wavelength of the laser beam such that the amplitude of this light is approximately the same as that of light emitted from the fluorescent ink. A photodetector receives the filtered light and produces a signal which is representative of the swept bar code irrespective of whether it is a standard bar code or a fluorescent bar code.

Accordingly, a bar code reading system in accordance with the invention may comprise a means for sweeping a light beam having a first wavelength across a bar code. Light from the bar code is passed through a filter for attenuating laser light scattered by said bar code to approximately a level of light emitted from a fluorescent ink, having an excitation wavelength equal to said first wavelength, in response to irradiation by said light beam. The filtered light is received by a means for generating a signal representative of the amplitude of the filtered light. The signal is decoded by a means for decoding the signal to provide a bit string encoded in said bar code.

Similarly, a method for reading a bar code in accordance with the invention may comprise sweeping a light beam having a first wavelength across a bar code. Laser light scattered by the bar code is attenuated to approximately a level of light emitted from a fluorescent ink, having an excitation wavelength equal to said first wavelength, in response to irradiation by said light beam. A signal is generated which is representative of amplitude level of the filtered light. The bit string encoded in the bar code is then provided by decoding the signal.

BRIEF DESCRIPTION OF THE DRAWINGS

The features and advantages of the invention will be understood from the following detailed description of preferred embodiments, which should be read in conjunction with the accompanying drawings in which:

FIG. 2 is a graph showing the bandwidth of an optical filter in accordance with a preferred embodiment of the invention.

DETAILED DESCRIPTION OF PREFERRED EMBODIMENTS

Figure 1:
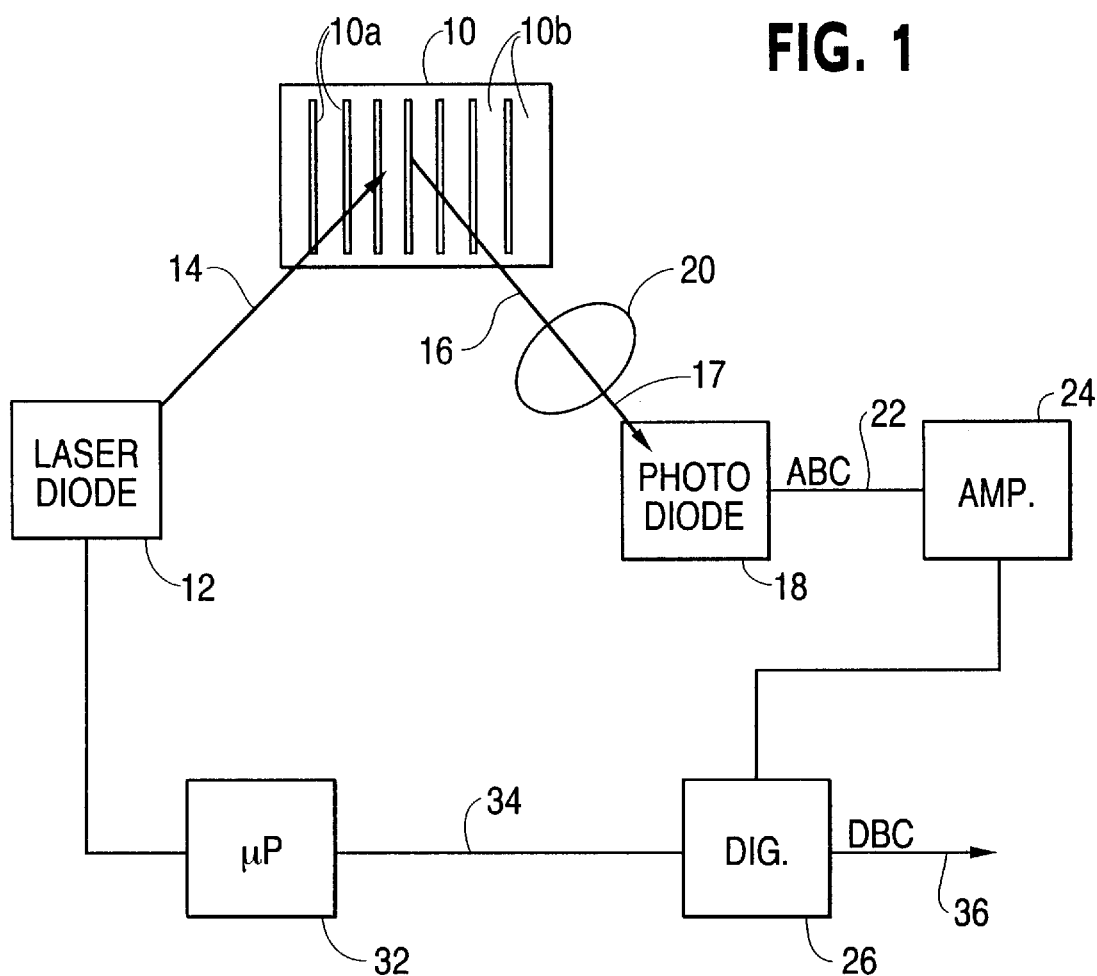
FIG. 1 is a block diagram of a bar code reader in accordance with a preferred embodiment of the invention.

FIG. 1 provides a block diagram of a preferred embodiment of a bar code reader in accordance with the invention. As shown in FIG. 1, a bar code 10 includes bars 10a, which may be printed with either a dark ink, as in a standard bar code, or with a fluorescent ink, as in a fluorescent bar code. Spaces 10b separate bars 10a. A laser diode 12 emits a laser beam 14 having a wavelength that corresponds to the excitation wavelength of a fluorescent ink, for example, 670 nm. The laser beam 14 is swept across the bar code label 10, for example, by a rotating mirror (not shown) or another equivalent beam sweeping means. Light 16 returned by the bar code 10, through scattering and, in the case of a fluorescent bar code, through emission, is passed through optical filter 20, which yields filtered light 17. The filtered light 17 is received by photodiode circuit 18.

Optical filter 20 is chosen to pass substantially all of light having a wavelength within the emission band of a fluorescent ink irradiated by the laser beam, for example, light having a wavelength of 720 nm. Optical filter 20 is further chosen to attenuate light having the wavelength of the laser beam such that the power of scattered light from the laser beam which is received at the filter is reduced to approximately the same level as that of light which would be emitted by a fluorescent ink under irradiation by the laser beam. By using such a filter, a photodiode having sufficient sensitivity to detect emitted light may be employed without concern for saturation of the photodiode by scattered light.

The properties of a filter employed in a preferred embodiment are illustrated in FIG. 2. Line 50 represents the attenuation of optical filter 20, which has a pass band centered at 720 nm. Preferably, optical filter 20 transmits approximately 70% or more of light having a wavelength of 720 nm, and approximately 50% or more of light having a wavelength of 705 nm or 735 nm. With these values, the optical filter 20 essentially allows transmission of most of emitted light while preventing significant transmission of stray light such as room light and day light. Optical filter 20 further allows minimal transmission of light below 705 nm and above 735 nm, providing, for example, 0.1% transmission of light at 670 nm.

Line 54 of FIG. 2 represents the amplitude of light received at the filter due to scattering of the laser beam at the surface of a light portion of a standard bar code. The scattered light received at the filter in this example has a power of approximately 0.33% of that of the laser beam. Line 52 represents the amplitude of light emitted from a printed bar of a fluorescent bar code in response to excitation by the laser beam. The emitted light has a power of approximately 0.00033% of that of the laser beam. Through the attenuation of the optical. filter, light having a wavelength of 720 nm is attenuated by the filter to approximately 70%, while light having a wavelength of 670 nm is attenuated to approximately 0.1%. Consequently, emitted light leaves the filter at a power of approximately 0.00023% of the power of the laser beam, while scattered light leaves at a power of approximately 0.00033% of the power of the laser beam. The scattered light therefore has an amplitude which will not saturate a photodiode that has been chosen to have a sensitivity for detecting the emitted light.

Returning to FIG. 1, photodiode circuit 16 receives light 17 transmitted by the optical filter 20 and generates an analog signal ABC that is representative of the light levels received at the photodiode through scattering or fluorescence upon sweeping of the bar code by the laser. Analog signal ABC is provided on line 22 to amplifier 24. Amplifier 24 is preferably an automatic gain control amplifier which amplifies signal ABC to a constant level to compensate for systematic variations in the received light. For example, the gain of amplifier 24 may be varied as a function of the corresponding angular position of laser beam 14 to compensate for variable scatter and absorption of the beam at the substrate. Amplifier 24 provides an amplified signal ABC to a digitizer 26, which in turn produces a digitized bar code signal DBC. The digitized bar code signal may be provided to a decoder (not shown) over a bus 36 for decoding. The operation of the laser diode circuit 12 and digitizer 26 may be controlled by a microprocessor 32.

Operation of the preferred embodiment of the invention addressed above is now described. In operation, it is not known ahead of time whether a bar code to be scanned is a standard bar code or a fluorescent bar code. For purposes of this description, it will be assumed that the bar code represents the bit string 101. Thus, if the bar code is a standard bar codes it will consist of a light bar ("high" or 1), a dark (printed) bar ("low" or 0), and a light bar. Conversely, if the bar code is a fluorescent bar code, it will consist of a fluorescent (printed) bar, a blank bar, and a fluorescent bar.

A laser beam is swept across the bar code. If the bar code is a standard bar code, it produces a pattern consisting of a first bright scattered portion corresponding to the first light bar, a relatively dark scattered portion corresponding to the dark bar, and a second bright scattered portion corresponding to the second light bar. The scattered light is substantially attenuated by the filter to within a predetermined power range corresponding to the sensitivity of the photodiode. Similarly, if the bar code is a fluorescent bar code, it produces a pattern consisting of a first bright portion corresponding to the first fluorescent bar which is comprised of emitted light and scattered light, a relatively dark portion corresponding to the blank bar which is comprised only of scattered light, and a second bright portion corresponding to the second fluorescent bar. The emitted light is minimally attenuated and is within the range corresponding to the sensitivity of the photodiode, and any scattered light is heavily attenuated. Therefore, irrespective of the type of bar code, the photodiode 18 detects a pattern in the order of light-dark-light that is transmitted at a level which is calibrated to its specific sensitivity. The photodiode produces a corresponding analog signal which is subsequently amplified, digitized, and decoded to yield the bit string 101. Therefore, a bar code reader in accordance with the invention may be used to read either a standard bar code or a fluorescent bar code.

It may be useful in some applications to employ a redundant scanning pattern in which the bar code is scanned multiple times and processed in alternative manners for purposes of confirmation. In one contemplated embodiment, the bar code scanner reads each bar code label twice. The digitizer processes the first read as if it is direct code, and the second read as if it is inverted code. Microprocessor 32 provides a signal to digitizer 26 on bus 34, which causes the digitizer to alternate processing between direct code and inverted code after receipt of an incoming signal. During a first sweep, the detected pattern is processed as direct code and passed to a decoder on bus 36, while during the second sweep, the detected pattern is processed as inverted code, and then inverted before it is passed to the decoder on bus 36. Thus, regardless of which type of code is being read, digitizer 26 outputs the same signal on bus 36.

A variety of fluorescent inks having various excitation wavelengths and emission bands are known in the art. Among them are the inks disclosed in U.S. Pat. Nos. 5,292,855 issued Mar. 8, 1994; 5,336,714 issued Aug. 9, 1994; 5,397,819 issued Mar. 14, 1995; 5,423,432 issued Jun. 13, 1995; and 5,461,136 issued Oct. 24, 1995 to Krutak et al., each of which is hereby incorporated by reference for its teaching of fluorescent inks. Other fluorescent inks, as well as other alternative and additional components of bar code readers, will be known to those having ordinary skill in the art from the teachings within the field of the invention, and the invention should be understood to encompass alternative embodiments formulated in accordance with those teachings as well as the preferred embodiments described herein. The foregoing description is by way of example only and is not intended to be limiting. The scope of the invention is limited only in the manner defined in the following claims.

What is claimed is:

1. A bar code reading system comprising:

means for sweeping a light beam having a first wavelength across a bar code;

a filter for selectively attenuating light of said beam scattered by said bar code to approximately a level of light emitted from a fluorescent ink, having an excitation wavelength equal to said first wavelength, in response to irradiation by said light beam;

means for generating a signal representative of the amplitude of light passed through said filter; and means for decoding said signal to provide a bit string encoded in said bar code.

2. The bar code reading system of claim 1, wherein said first wavelength is approximately 650 nm to 690 nm and said light emitted from said fluorescent ink has a wavelength within a range of approximately 705 nm to 735 nm.

3. The bar code reading system of claim 1, further comprising a processor for controlling said means for sweeping said light beam.

4. The bar code reading system of claim 1, wherein said means for sweeping a light beam comprises a laser diode.

5. The bar code reading system of claim 1, wherein said means for generating a signal comprises a photo diode.

6. The bar code reading system of claim 5, wherein said means for generating a signal further comprises an automatic gain control amplifier for providing an analog signal to a digitizer.

7. A method for reading a bar code, comprising:

sweeping a light beam having a first wavelength across a bar code;

selectively attenuating light of said beam scattered by said bar code to approximately a level of light emitted from a fluorescent ink having an excitation wavelength equal to said first wavelength, in response to irradiation by said light beam;

generating a signal representative of the amplitude of light passed through said filter, and decoding said signal to provide a bit string encoded in said bar code.

8. The method of claim 7, further comprising:

sweeping a second light beam having a first wavelength across a bar code;

attenuating light of said second beam scattered by said bar code to approximately a level of light emitted from a fluorescent ink, having an excitation wavelength equal to said first wavelength, in response to irradiation by said light beam;

generating a second signal representative of the amplitude light passed through said filter;

digitizing said second signal as if it is an inverted signal to produce a digitized signal;

inverting said digitized signal; and decoding said digitized signal to provide a bit string encoded in said bar code.

9. A bar code reading system comprising:

means for sweeping a light beam across a bar code;

a filter for selectively attenuating light of said beam scattered by said bar code to approximately a level of light emitted from a fluorescent ink having an excitation wavelength equal to said first wavelength in response to irradiation by said light beam;

a photodetector unit for generating a signal representative of the sum of amplitudes of light scattered by said bar code and selectively filtered by said filter, and of light emitted by said bar code; and means for decoding said signal to provide a bit string encoded in said bar code.

\* \* \* \* \*